United States Patent
Falk et al.

(10) Patent No.: US 10,349,504 B2
(45) Date of Patent: Jul. 9, 2019

(54) FLASH GENERATOR FOR A FLASH TUBE

(71) Applicant: PROFOTO AB, Sundbyberg (SE)

(72) Inventors: Anton Falk, Huddinge (SE); Michael Sundkvist, Stockholm (SE)

(73) Assignee: PROFOTO AB, Sundbyberg (SE)

( * ) Notice: Subject to any disclaimer, the term of this patent is extended or adjusted under 35 U.S.C. 154(b) by 0 days.

(21) Appl. No.: 15/500,507

(22) PCT Filed: Oct. 26, 2015

(86) PCT No.: PCT/SE2015/051133
§ 371 (c)(1),
(2) Date: Jan. 30, 2017

(87) PCT Pub. No.: WO2016/076777
PCT Pub. Date: May 19, 2016

(65) Prior Publication Data
US 2017/0311428 A1    Oct. 26, 2017

(30) Foreign Application Priority Data
Nov. 14, 2014    (SE) ...................................... 1451362

(51) Int. Cl.
*G03B 7/17* (2014.01)
*H05B 41/30* (2006.01)
(Continued)

(52) U.S. Cl.
CPC .............. *H05B 41/30* (2013.01); *G03B 7/17* (2015.01); *G03B 15/05* (2013.01); *H05B 41/38* (2013.01)

(58) Field of Classification Search
CPC .......... H05B 41/30; H05B 41/38; G03B 7/17; G03B 15/05
(Continued)

(56) References Cited

U.S. PATENT DOCUMENTS 6,359,651 B1 * 3/2002 Yokonuma ........... H04N 5/2354
348/229.1
7,462,992 B2   12/2008 Arbinger et al.
(Continued)

FOREIGN PATENT DOCUMENTS

CN         1781343 A      5/2006
CN       102160467 A      8/2011
(Continued)

OTHER PUBLICATIONS

Translation from french to english: Marignier et al. FR 2926948 Al, Generator of Luminous Flashes, Spectrometer of Absorption using such as Generator and Process of Luminous Flashes, Publ. Jul. 31, 2009.*
(Continued)

*Primary Examiner* — Clayton E. LaBalle
*Assistant Examiner* — Linda B Smith
(74) *Attorney, Agent, or Firm* — Knobbe, Martens, Olson & Bear, LLP

(57) ABSTRACT

The present disclosure relates to a flash generator for providing power supply to a flash tube so that the flash tube rapidly provides a light output adapted to FP-sync, Flat Peak. The flash generator comprises a capacitor bank, an output and a switch configured to switch a current flow from the capacitor bank via the output to provide a variable power via the output. The flash generator further comprises a controller for controlling the switch, whereby by controlling the on time of the switch, the generator is operative to provide, during a time period of 100 to 2000 μs during a peak time period within the time period, an average power at least 4 times higher than the average power provided during the other time period within the time period, whereby the flash tube during the peak time period becomes fully ignited.

20 Claims, 3 Drawing Sheets

(51) Int. Cl.
*G03B 15/05* (2006.01)
*H05B 41/38* (2006.01)

(58) Field of Classification Search
USPC .......................................................... 396/187
See application file for complete search history.

(56) References Cited

U.S. PATENT DOCUMENTS

| | | | |
|---|---|---|---|
| 8,183,791 B1 | 5/2012 | Xiong | |
| 8,531,122 B2 | 9/2013 | Braun et al. | |
| 9,006,988 B2 | 4/2015 | Zhang et al. | |
| 9,690,169 B2 * | 6/2017 | Clark | G03B 15/05 |
| 2002/0048457 A1 | 4/2002 | Matsui | |
| 2006/0017400 A1 | 1/2006 | Tehori et al. | |
| 2007/0080650 A1 | 4/2007 | Arbinger et al. | |
| 2011/0169427 A1 | 7/2011 | Braun et al. | |
| 2011/0187920 A1 | 8/2011 | Shimada et al. | |
| 2012/0098452 A1 | 4/2012 | Zhang et al. | |
| 2012/0127361 A1 * | 5/2012 | Clark | G03B 9/40 348/371 |
| 2015/0373818 A1 | 12/2015 | Otterberg | |

FOREIGN PATENT DOCUMENTS

| | | | |
|---|---|---|---|
| CN | 102458027 A | | 5/2012 |
| CN | 104995999 A | | 10/2015 |
| FR | 2926948 A1 | * | 7/2009 |
| JP | 2000-347258 A | | 12/2000 |
| JP | 2003-172970 A | | 6/2003 |
| WO | WO 2010/024765 A1 | | 3/2010 |
| WO | WO 2010/093914 A1 | | 8/2010 |
| WO | WO 2011/134796 A3 | | 6/2012 |
| WO | WO 2014/126528 A1 | | 8/2014 |

OTHER PUBLICATIONS

International Search Report and Written Opinion for PCT Application No. PCT/SE2015/051133, dated Feb. 24, 2016, 9 pages.
Extended European Search Report for European Patent Application No. 15858723.8, dated May 14, 2018, in 11 pages.
Office Action issued in Chinese Patent Application No. 201580061730.5 dated Oct. 18, 2018, in 9 pages.

* cited by examiner

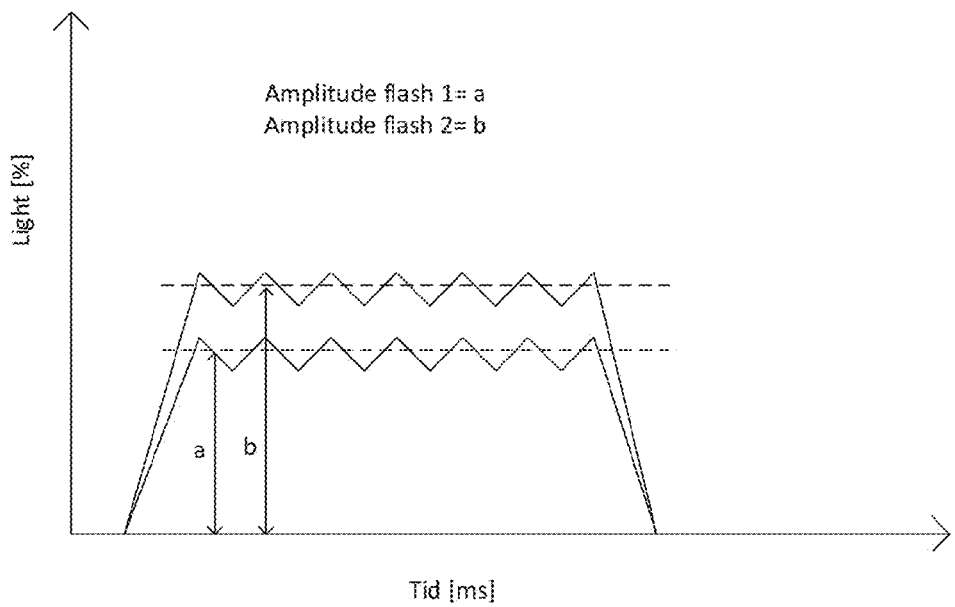
Fig. 1 – Prior Art
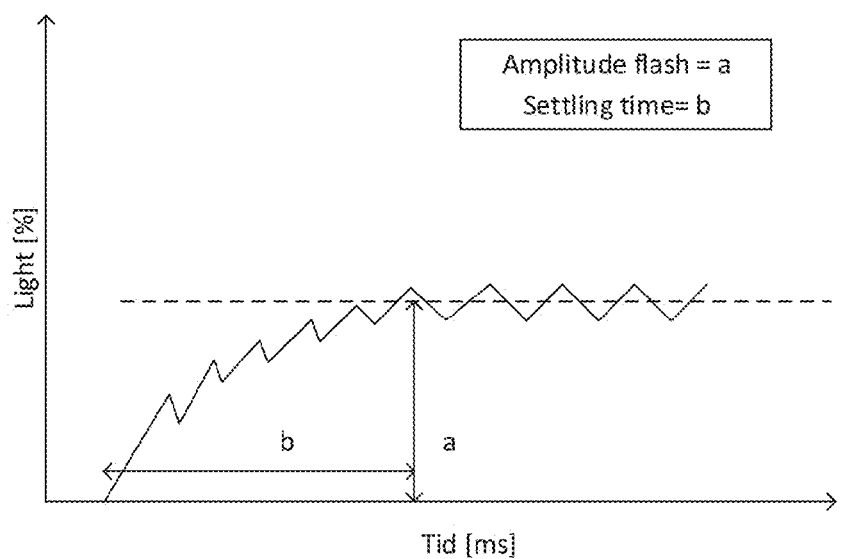
Fig. 2 – Prior Art

FLASH GENERATOR FOR A FLASH TUBE

CROSS-REFERENCE TO RELATED APPLICATIONS

This application is the U.S. National Phase under 35 U.S.C. § 371 of International Application No. PCT/SE2015/051133, filed Oct. 26, 2015, titled A FLASH GENERATOR FOR A FLASH TUBE, which claims priority to SE Patent Application No. 1451362-6, filed Nov. 14, 2014, the entirety of each of which is hereby expressly incorporated by reference herein.

TECHNICAL FIELD

The present disclosure relates to a flash generator for providing a power supply to a flash tube so that the flash tube rapidly provides a light output adapted to FP-sync, Flat Peak. The disclosure also relates to a flash system comprising the flash tube and the flash generator.

BACKGROUND

Flash generators employ a capacitor bank for storing an amount of energy which can be discharged through a flash tube so as to generate a discharge and a flash light. During the discharge, plasma is formed inside the flash tube where the character of the plasma also determines the character of the flash light. A flash tube is dimensioned, as far as is possible, to give constant light characteristics throughout its entire dynamic range. A series of parameters, such as the physical dimensions of the flash tube, the gas pressure, the gas mixture and the composition of the electrodes is adapted in order, together with the operating voltage and capacities of the flash unit, to provide the optimal conditions for constant light characteristics within the dynamic range of the electron flash tube.

In a camera, flash tube synchronization is defined as synchronizing the firing of the flash tube with the opening of the shutter admitting light to photographic film or image sensor. One type of flash tube synchronization is FP-sync, Flat Peak. FP-sync is used with flash tubes designed specifically for use with focal-plane shutters. A focal-plane shutter uses two shutter curtains that run horizontally or vertically across the image sensor plane. For slower shutter speeds, the first curtain opens, and after the required time with the shutter open, the second curtain closes the aperture in the same direction. Faster shutter speeds are achieved by the second curtain closing before the first one has fully opened. This results in a slit that travels across the image sensor. Faster shutter speeds simply require a narrower slit, as the speed of travel of the shutter curtains is not normally varied. Using this technique, modern SLR cameras are capable of shutter speeds of up to $\frac{1}{2000}$, $\frac{1}{4000}$ or even $\frac{1}{8000}$ of a second.

When using a focal plane shutter, although each part of the image sensor is exposed for the rated exposure time, the image sensor is exposed by a slit which moves across the image sensor in a time, the X-sync speed. The X-sync speed may be of the order of $\frac{1}{250}$. Although the exposure of each part of the image sensor may be $\frac{1}{2000}$, the last part of the image sensor is exposed later by the X-sync time than the first part of the image sensor. If the flash tube discharge for a shorter time than the X-sync speed only parts of the image sensor will be illuminated. Flash tubes that discharge during the entire X-sync time will result in that the entire image sensor will be illuminated even at higher shutter speeds.

When the flash tube is discharged for a long time with constant energy required to illuminate the entire image sensor, the flash tube can be considered as a fixed light source. One problem with a flash tube that is designed for a discharge with a much larger energy and a shorter duration is that the plasma formed in the flash tube will not be constant when the flash tube is discharged for a long time. This results in a varying energy from the flash tube every time the flash tube is discharged.

FIG. 1 illustrates the energy level for different discharges when the flash tube is discharged for a long time. As can be seen from FIG. 1, energy will vary from one flash discharge (a) to another flash discharge (b). If the flash discharges are shorter with higher energy levels for the different flashes, the energy variation of the light would not vary to the same extent from the different flash discharges.

FIG. 2 illustrates another problem when discharging flash tubes for longer times at lower energy levels. As illustrated in FIG. 2, it takes longer time to achieve constant amplitude over time compared to a flash with higher amplitude over time.

Thus, when increasing the discharge time and lowering the energy from the flash tube, the discharge gives a low quality of light from the flash tube. This since a flash tube which is adapted for discharges of high energy amounts during short times does not give repeatable stable discharges at low energy amounts and longer discharge times. Yet another problem when discharging during longer times is that that the energy level variations are considerably higher than the variations which occur on discharges during shorter times and higher energy amounts.

Consequently, there is a need for an improved solution for discharging flash tubes, which solution solves or at least mitigates at least one of the above mentioned problems.

SUMMARY

It is an object of the invention to provide a flash generator for a flash tube capable of providing a power supply to a flash tube so that the flash tube rapidly provides a light output adapted to FP-sync.

This object is addressed by a flash generator of providing a power supply to a flash tube so that the flash tube rapidly provides a light output adapted to FP-sync. The flash generator comprises a capacitor bank, an output and a switch configured to switch a current flow from the capacitor bank via the output to provide a variable power via the output.

The flash generator further comprises a controller for controlling the switch, whereby by controlling the on time of the switch, the generator is operative to provide during a time period of 100 to 2000 μs, during a peak time period within the time period, an average power at least 4 times higher than the average power provided during the other time period within the time period, whereby the flash tube during the peak time period becomes fully ignited.

Since the flash generator during a peak time period provides an average power at least 4 times higher than the average power provided during the other time period, gas in the flash tube becomes preheated. When the gas in the flash tube becomes preheated a current path in the flash tube is defined. This results in that the variation in energy level between different discharges becomes much smaller compared to if the gas is not preheated.

Yet another advantage of the driver circuit is that by providing, during a peak time period, an average power at least 4 times higher than the average power provided during the other time period, is that the time before the light from the flash tube becomes stable is reduced. Thus, a flash tube connected to the flash generator more rapidly can provide a light output adapted to FP-sync. The light output from the flash tube become stable at the latest after the time period of 100 to 2000 μs.

Another advantage of the flash generator is that it provides the option to individually control the average power during different parts of the discharge. In an exemplary embodiment of the flash generator it is therefore possible to individually control average power so that the average power during a peak time period is more than 4 times higher than the average power provided during the other time. This is an advantage if different flash tubes with different characteristics are connected to the flash generator.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIG. 1 illustrates the energy level for different discharges when the flash tube is discharged for a long time.

FIG. 2 illustrates another problem when discharging flash tubes for longer times at lower energy levels.

DETAILED DESCRIPTION

Figure 3:
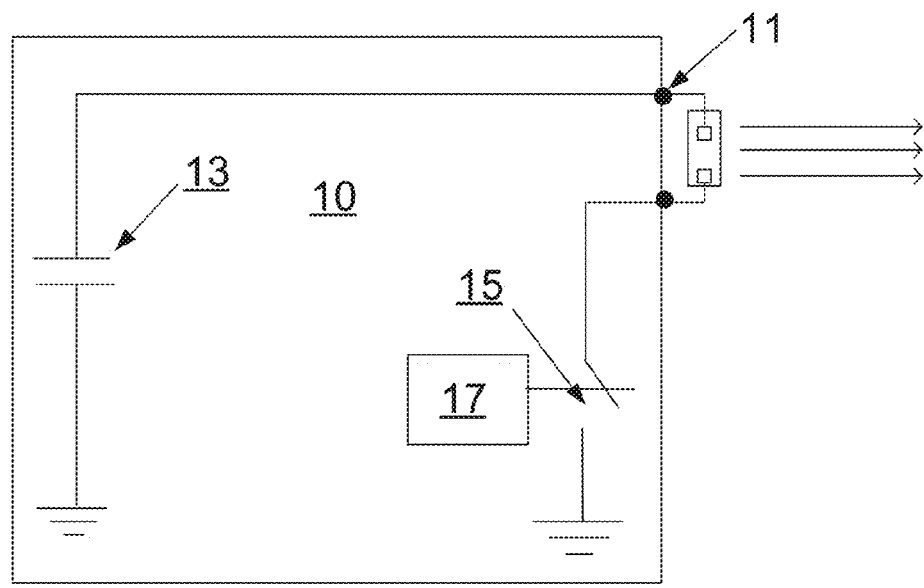
FIG. 3 illustrates a schematic block diagram of a flash generator according to an aspect of the present disclosure.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 3 illustrates a flash generator 10 of providing a power supply to a flash tube so that the flash tube rapidly provides a light output adapted to FP-sync, Flat Peak, according to an exemplary embodiment of the present disclosure. The flash generator 10 may be used to power supply different types of flash tubes. One type of flash tube that the flash generator 10 may be used to power is a flash tube wherein the volume of the flash tube is between 10 and 40 ccm (cubic cm). According to one aspect of the present disclosure, the flash generator 10 is particularly advantageous for supplying power to a flash tube that is designed to produce a flash with high energy during a short period.

The flash generator 10 comprises a capacitor bank 13, an output 11 and a switch 15 configured to switch a current flow from the capacitor bank 13 via the output 11 to provide a variable power via the output 11. The switch 15 is controlled by a controller 17. According to one exemplary embodiment of the flash generator 10 according to the present disclosure the controller 17 is adapted to control the switch 15 so that the flash generator 10 provides during a time period of 100 to 2000 μs, during a peak time period within the time period an average power at least 4 times higher than the average power provided during the other time period within the time period, whereby the flash tube during the peak time period becomes fully ignited.

By providing during a peak time period an average power at least 4 times higher than the average power provided during the other time period, gas in the flash tube becomes preheated. When the gas in the flash tube becomes preheated a current path in the flash tube is defined. This result in that the variation in energy level between different discharges become much smaller compared to if the gas is not preheated.

Another advantage obtained by providing during a peak time period an average power at least 4 times higher than the average power provided during the other time period is that the time before the light from the flash tube becomes stable is reduced. Thus can a flash tube connected to the flash generator 10 more rapidly provide a light output adapted to FP-sync. The light output from the flash tube become stable at the latest after the time period of 100 to 2000 μs. This is particularly important when using the flash generator 10 in wireless flash trigger systems. In a wireless flash trigger system there is often a delay after the photographer has pressed the exposure button until the flash tube starts to emit light. This since it takes some time before the flash generator has received the wireless flash trigger signal, obtained the correct power settings and starts to output power to the flash tube.

It even more important that the light from the flash tube connected to the flash generator 10 becomes stable in a flash generator 10 which supports TTL, Through the Lens, setting of the flash power. In TTL flash generator systems, the camera body measuring flash light, provided by the flash tube during a pre-flash of the flash tube. The measurement is performed through the lens of the camera. The camera then via a transmitter connected to the camera wirelessly provides the flash generator 10 the amount of power, to be applied by a main flash during the actual image acquisition procedure. This procedure takes some time and it is therefore important that flash generator 10 provides a power supply so that to a flash tube rapidly provides a stable light output.

Figure 4:
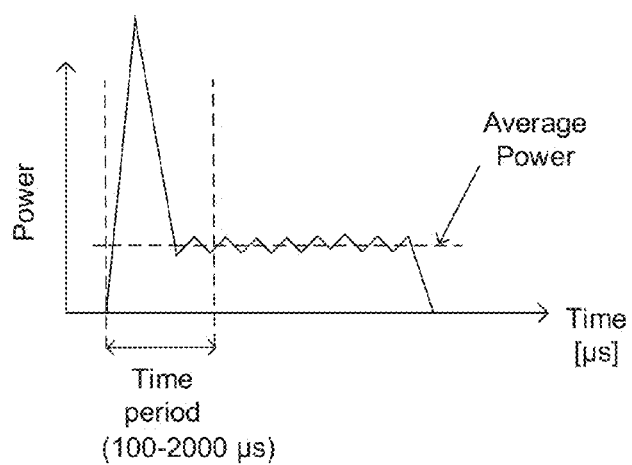
FIG. 4 illustrates the average power level for a discharge of a flash tube connected to the flash generator according an exemplary embodiment of the present disclosure.

FIG. 4 illustrates an example of light output from a flash tube connected to the flash generator 10 according to the present disclosure. In this example the peak time period is in the beginning of the time period and the other time period is subsequent the peak time period. As can be seen in FIG. 4, since the flash generator 10, during the peak time period in the beginning of the time period, provides an average power at least 4 times higher than the average power provided during the other time period within the time period, the initial light output is high. During this peak period the flash tube becomes preheated and a current path in the flash tube is thus defined. Therefore in the later time period subsequent the time period, the flash tube provides a stable light output that will not vary between different flash discharges.

According to one exemplary embodiment the peak time period is between 20 and 500 μs. The peak time period may need to be varied depending on what type of flash tube that is connected to the flash generator 10. According to another aspect of the present disclosure is the peak time period varied depending on the output power of the flash generator 10.

Since the time period including the peak time period and the other time period is between 100 to 2000 μs, the other time period within the time period is dependent on the length of the peak time period. According to one exemplary embodiment the other time period is between 20 and 1980 µs.

As mentioned above, in the later time period subsequent the time period, the flash generator provides a light output that does not vary between consecutive discharges. In one exemplary embodiment of the present disclosure the flash generator provides the stable light output during at least 100 µs. According to another exemplary embodiment of the present disclosure the flash generator provides the stable light output during at least 200 µs. The duration of the later time period may vary depending on the shutter speed and/or camera brand.

According to one exemplary embodiment of the flash generator 10 according to the present disclosure the average on time of the switch during the peak time period is between 80 and 100% and the average on time of the switch during the other time period is between 10 and 70%.

According to one exemplary embodiment of the flash generator 10 according to the present disclosure the period time of the switch during the later time period is shorter than 6.25 µs.

According to yet another exemplary embodiment of the flash generator 10 according to the present disclosure the average power provided during the peak period is at least 10 to 50 times higher than the average power provided during the other time period.

According to yet another exemplary embodiment of the flash generator 10 according to the present disclosure the duty cycle of the switch during the later time period is increasing in dependence of a voltage drop of the capacitor bank.

According to yet another exemplary embodiment of the flash generator 10 according to the present disclosure the volume of the flash tube is between 10 and 40 ccm.

Figure 5:
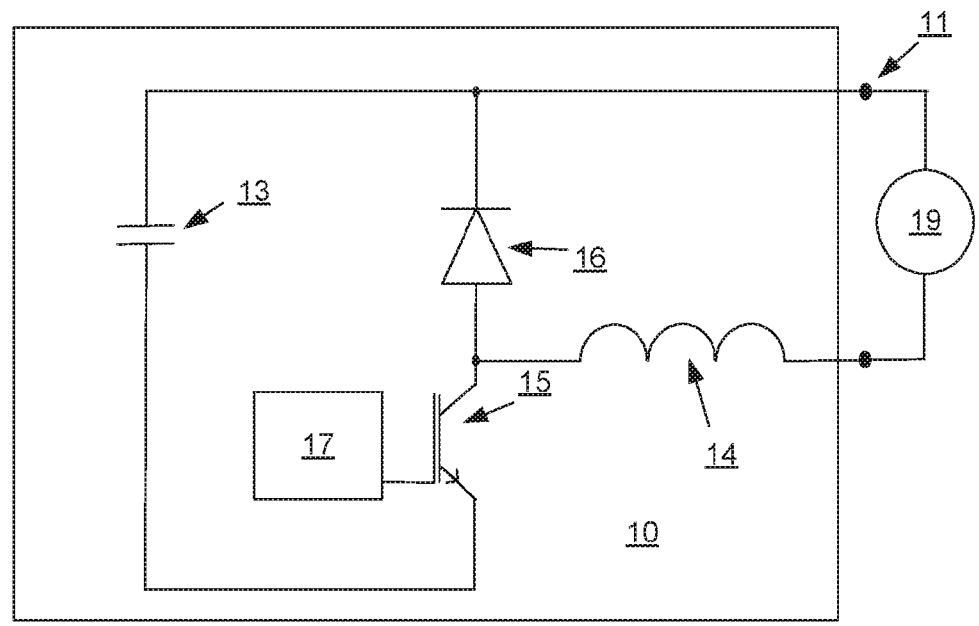
FIG. 5 illustrates a schematic block diagram of a flash generator according to an aspect of the present disclosure.

FIG. 5 illustrates a flash generator 10 of providing a power supply to a flash tube so that the flash tube rapidly provides a light output adapted to FP-sync according to another exemplary embodiment of the present disclosure. In this exemplary embodiment the flash generator 10 also comprises a switch 15. The switch 15 is connected in series with the output across the capacitor bank 13. Further, a component 16 which only allows current flow in one direction is connected across the output and an inductor 14, with a polarity opposite to a direction of energy supply from the capacitor bank 13 to the output 11. The capacitor bank 13 can be of different types. The capacitor bank 13 can be a foil type capacitor or an electrolytic type capacitor. Different types of capacitor banks 13 have different internal resistant. Foil type capacitors have low internal resistance compared to electrolytic type capacitors. Therefore it is possible to discharge a foil type capacitor faster and thus generate a higher current density and higher energy levels compared with an electrolytic type capacitor.

Figure 6:
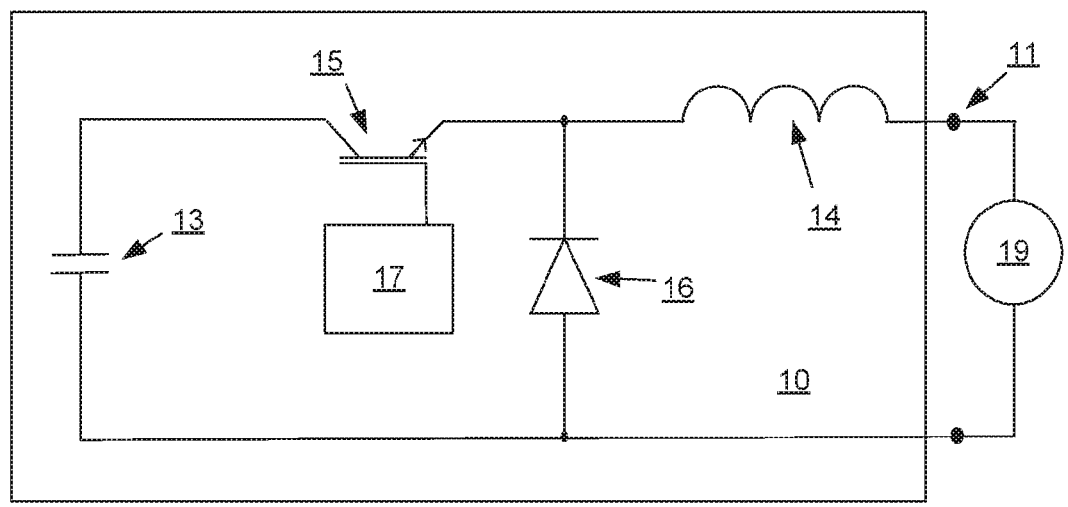
FIG. 6 illustrates a schematic block diagram of a flash generator according to an aspect of the present disclosure.

FIG. 6 illustrates a flash generator 10 of providing a power supply to a flash tube so that the flash tube rapidly provides a light output adapted to FP-sync according to another exemplary embodiment of the present disclosure. In this exemplary embodiment the flash generator 10 also comprises a switch 15. The switch 15 is connected in series with the capacitor bank 13. Further, a component 16 which only allows current flow in one direction is connected across the switch 15 and the capacitor bank 13, with a polarity opposite to a direction of energy supply. The inductor 14 is connected in series with the output across the component 16 which only allows current flow in one direction.

In the exemplary embodiment illustrated in FIGS. 4, 5 and 6 only one capacitor bank is illustrated. Other exemplary embodiments of the flash generator 10 according to the present disclosure the flash generator comprise several capacitor banks 13. In these exemplary embodiments are the capacitor banks 13 connected in parallel with each other. Having several capacitor banks 13 connected in parallel give the capacitors banks 13 a higher capacitance which make is possible to store more energy compared to using only one capacitor bank 13. Capacitors banks 13 connected in parallel in other exemplary embodiments can also be of different types. A first capacitor bank 13 can be a foil type capacitor and the second type of capacitor bank can be an electrolytic type capacitor. By mixing capacitor banks of different types, another flash energy can be achieved from a flash tube connected to the flash generator 10 compared to if only one type of capacitor bank were used. In these exemplary embodiments with capacitors banks 13 of different types connected in parallel the capacitor banks 13 can also be used individually. Using e.g. only a foil type of capacitor provides a shorter flash time compared to using an electrolytic type of capacitor of the same size.

Other exemplary embodiments than the embodiment illustrated in FIG. 5 can also comprise several inductors 14 and switches 15. In these exemplary embodiments the inductors 14 are connected in parallel. Using several inductors 14 in parallel give the advantage that the flash generator 10 can handle higher currents compared to if only one inductor 14 is used. Several inductors 14 in parallel also change the inductance. The switches 15 also are connected in parallel in the exemplary embodiments containing more than one switch 15.

In one exemplary embodiment of the flash generator 10 according to the present invention the component is a diode 16. The diode 16 is then connected with a polarity opposite to a direction of energy supply from the capacitor bank 13 to the output 11. In another exemplary embodiment of the flash generator 10 the component 16 is a MOSFET, Metal Oxide Semiconductor Field Effect Transistor, connected to the controller, and wherein the controller 17 is configured to control the MOSFET so that the MOSFET does not conduct current when the switch conducts current.

The controller 17 can comprises receiving means for receive parameters related to a desired flash energy during the subsequent the time period and/or the type of flash tube connected to the flash generator 10. These parameters are then used by the controller 17 when determining how to control the switch in order to produce a flash with the desired characteristics according to the parameters received by the receiving means. In one exemplary embodiment the receiving means receives a desired flash energy.

In yet another exemplary embodiment the receiving means also receives information about what type of flash tube that is connected to the flash generator. In this exemplary embodiment the controller is further configured to use this information when determining how to control the switch.

The energy level from the flash tube is dependent on the current through the flash tube connected to the flash generator 10. A higher current leads to a higher energy level from the flash tube and a lower current leads to a lower energy level from the flash tube. The energy level will therefore vary with the rise and fall of the current through the flash tube.

According to aspects of the present disclosure the controller 17 is configured to increase the duty cycle to achieve a higher average power from the flash tube and to decrease the duty cycle to achieve lower average power from the flash tube. Increasing the duty cycle for the switch 15 imply that the switch 15 will be closed during a longer period of the duty cycle and thereby will the current through a flash tube connected to the flash generator 10 increase. A higher current through the flash tube results in a higher average power.

According to aspects of the present disclosure the controller 17 is further configured to change the duty cycle of the switch 15 within the peak time period, the other time period and the subsequent time period thereby obtaining different average power from the flash tube within these different periods. In a first part of the peak time period and/or other time period the controller 17 may use a first duty cycle and then change to another duty cycle for the rest of the peak time period and/or other time period. Using different duty cycles during peak time period and/or other time period results in that the average power from the flash tube will vary during the peak time period and/or other time period. A longer duty cycle can e.g. be used in the beginning of the peak time period and/or other time period than in the end the peak time period and/or other time period. This will result in that the average power from the flash tube will fall towards the end of the peak time period and/or other time period.

According to yet another aspect of the present disclosure the flash generator 10 is adapted to handle different capacitor voltages, the average power from the flash tube can be kept constant by controlling the duty cycle. Therefore several flashes with the same average power from the flash tube can be fired independent of capacitor charging in between, as long as sufficient energy is stored in the capacitors. In this aspect of the present disclosure, when the voltage of the flash capacitors is decreased due to several discharges, the duty cycle of the switch is increased to get a desired average power from the flash tube, as long as sufficient energy is stored in the capacitors.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

What is claimed is:

1. A flash generator for providing a power supply to a flash tube so that the flash tube rapidly provides a light output adapted to FP-sync, Flat Peak, comprising:
    a capacitor bank;
    an output;
    a switch configured to switch a current flow from the capacitor bank via the output to provide a variable power via the output;
    a controller for controlling the switch, whereby by controlling the on time of the switch the generator is operative to: provide during a time period of 100 to 2000 µs, during a peak time period within the time period an average power at least 4 times higher than the average power provided during the other time period within the time period;
    whereby the flash tube during the peak time period becomes fully ignited; and
    wherein a stable light output adapted to FP sync is generated during the average power provided during the other time period within the time period.

2. The flash generator according to claim 1, wherein the peak time period is in the beginning of the time period and the other time period is subsequent the peak time period.

3. The flash generator according to claim 1, wherein in a later time period subsequent the time period, the flash tube provides the light output during at least 100 µs.

4. The flash generator according to claim 1, wherein the peak time period is between 20 and 500 µs.

5. The flash generator according to claim 1, wherein the other time period is between 80 and 1980 µs.

6. The flash generator according to claim 1, wherein the volume of the flash tube is between 10 and 40 cubic cm.

7. A flash system comprising the flash tube and the flash generator according to claim 1.

8. The flash generator according to claim 1, wherein the variable power of the switch via the output comprises the average power during the peak time period and the average power during the other time period.

9. The flash generator according to claim 1, wherein the controller is configured control the average power within the time period by controlling the switch to have more than one on time.

10. The flash generator according to claim 1, wherein the controller is configured control the same switch to provide the average power during the peak time period and the average power during the other time period.

11. The flash generator according to claim 1, wherein the controller is configured to increase a duty cycle of the switch to achieve a higher average power from the flash tube and to decrease the duty cycle of the switch to achieve lower average power from the flash tube.

12. The flash generator according to claim 2, wherein the average power provided during the peak period is at least 10 to 50 times higher than the average power provided during the other time period.

13. The flash generator according to claim 3, wherein the other time period is between 100 µs and 14 ms.

14. The flash generator according to claim 3, wherein a duty cycle of the switch during the other time period is increasing in dependence of a voltage drop of the capacitor bank.

15. A flash generator for providing a power supply to a flash tube so that the flush tube rapidly provides a light output adapted to FP-sync, Flat Peak, comprising:
    a capacitor bank;
    an output;
    a switch configured to switch a current flow from the capacitor bank via the output to provide a variable power via the output;
    a controller for controlling the switch, whereby by controlling the on time of the switch the generator is operative to: provide during a time period of 100 to 2000 µs, during a peak time period within the time period an average power at least 4 times higher than the average power provided during the other time period within the time period;
    whereby the flash tube during the peak time period becomes fully ignited; and
    wherein the average on time of the switch during the peak time period is between 80 and 100% and the average on time of the switch during the other time period is between 10 and 70%.

16. The flash generator according to claim 15, wherein the controller is configured to increase a duty cycle of the switch to achieve a higher average power from the flash tube and to decrease the duty cycle of the switch to achieve lower average power from the flash tube.

17. The flash generator according to claim 15, wherein the controller is configured control the average power within the time period by controlling the switch to have more than one on time.

18. A flash generator for providing a power supply to a flash tube so that the flash tube rapidly provides a light output adapted to FP-sync, Flat Peak, comprising:
- a capacitor bank;
- an output;
- a switch configured to switch a current flow from the capacitor bank via the output to provide a variable power via the output;
- a controller for controlling the switch, whereby by controlling the on time of the switch the generator is operative to: provide during a time period of 100 to 2000 µs, during a peak time period within the time period an average power at least 4 times higher than the average power provided during the other time period within the time period;
- whereby the flash tube during the peak time period becomes fully ignited;
- wherein in a later time period subsequent the time period, the flash tube provides the light output during at least 100 µs; and
- wherein the period time of the switch during the later time period is shorter than 6.25 µs.

19. The flash generator according to claim 18, wherein the controller is configured to increase a duty cycle of the switch to achieve a higher average power from the flash tube and to decrease the duty cycle of the switch to achieve lower average power from the flash tube.

20. The flash generator according to claim 18, wherein the controller is configured control the same switch to provide the average power during the peak time period and the average power during the other time period.

* * * * *